(12) United States Patent
Gaikwad

(10) Patent No.: US 9,720,923 B2
(45) Date of Patent: Aug. 1, 2017

(54) SYSTEM FOR PROVIDING USER PRIVILEGE INFORMATION ASSOCIATED WITH SECURED DATA

(71) Applicant: Bank of America Corporation, Charlotte, NC (US)

(72) Inventor: Deepak Gujaba Gaikwad, Singapore (SG)

(73) Assignee: Bank of America Corporation, Charlotte, NC (US)

( * ) Notice: Subject to any disclaimer, the term of this patent is extended or adjusted under 35 U.S.C. 154(b) by 361 days.

(21) Appl. No.: 14/587,357

(22) Filed: Dec. 31, 2014

(65) Prior Publication Data

US 2016/0188617 A1   Jun. 30, 2016

(51) Int. Cl.
  *G06F 17/30*  (2006.01)
  *G06F 21/62*  (2013.01)
(52) U.S. Cl.
  CPC .... *G06F 17/30091* (2013.01); *G06F 21/6218* (2013.01)
(58) Field of Classification Search
  CPC .................. G06F 17/30091; G06F 21/6218
  USPC ........................................................ 707/785
  See application file for complete search history.

(56) References Cited

U.S. PATENT DOCUMENTS

| | | | | |
|---|---|---|---|---|
| 5,265,221 A | * | 11/1993 | Miller | G06F 9/468 |
| | | | | 235/382 |
| 5,765,153 A | * | 6/1998 | Benantar | G06F 9/468 |
| 6,141,778 A | * | 10/2000 | Kane | G06F 21/604 |
| | | | | 726/4 |
| 6,449,643 B1 | * | 9/2002 | Hyndman | G06F 21/629 |
| | | | | 709/223 |
| 8,219,823 B2 | * | 7/2012 | Carter | G06F 21/31 |
| | | | | 707/749 |
| 8,955,148 B1 | * | 2/2015 | Biegala | H04L 63/10 |
| | | | | 726/27 |
| 9,111,114 B1 | * | 8/2015 | Choi | |
| 2001/0027501 A1 | * | 10/2001 | O'Hare | G06F 12/1483 |
| | | | | 710/107 |
| 2002/0026592 A1 | * | 2/2002 | Gavrila | G06F 21/6218 |
| | | | | 726/6 |
| 2006/0074913 A1 | * | 4/2006 | O'Sullivan | G06F 17/3087 |
| 2006/0136991 A1 | * | 6/2006 | Kern | G06F 21/6227 |
| | | | | 726/2 |

(Continued)

*Primary Examiner* — Thanh-Ha Dang
(74) *Attorney, Agent, or Firm* — Baker Botts L.L.P.

(57) ABSTRACT

In one embodiment, a system receives a request for user privilege information associated with an object of a first database. The system determines a class of a second database that corresponds to the object and accesses user privilege records that the second database associates with the class. The system determines a subset of the user privilege records that correspond to a selected user. Each of the subset of user privilege records comprise a privilege and a user privilege value indicating whether the selected user is authorized for that privilege. The subset of user privilege records are consolidated into a privilege matrix comprising a first axis listing the selected user, a second axis listing the privileges, and for each intersection of selected user and privilege, a corresponding user privilege value determined from the subset of user privilege records. The system communicates the privilege matrix in response to the request.

20 Claims, 4 Drawing Sheets

(56) References Cited

U.S. PATENT DOCUMENTS

| | | | |
|---|---|---|---|
| 2007/0240231 A1* | 10/2007 | Haswarey | G06F 21/6218 726/28 |
| 2010/0036846 A1* | 2/2010 | Rafiq | G06F 17/30306 707/783 |
| 2010/0281060 A1* | 11/2010 | Ahmed | G06F 21/604 707/785 |
| 2011/0138452 A1* | 6/2011 | Dooley | H04L 63/20 726/8 |
| 2013/0304763 A1* | 11/2013 | Esposito | G06F 17/30 707/783 |
| 2014/0075571 A1* | 3/2014 | Jackson | G06F 17/30292 726/28 |

* cited by examiner

| CLASS 202 | PROFILE 168 | USER 204 | ACCESS 206 |
|---|---|---|---|
| XXXXXXXX 202a | XXXX.ABCD.PRIVILEGE1 168a | USERX 204a | Y 206a |
| XXXXXXXX 202a | XXXX.ABCD.PRIVILEGE1 168b | USERY 204b | N 206b |
| XXXXXXXX 202a | XXXX.ABCD.PRIVILEGE2 168c | USERX 204a | N 206c |
| XXXXXXXX 202a | XXXX.ABCD.PRIVILEGE3 168d | USERX 204a | Y 206d |
| XXXXXXXX 202a | XXXX.ABCD.PRIVILEGE2 168e | USERY 204b | N 206e |
| XXXXXXXX 202a | XXXX.ABCD.PRIVILEGE3 168f | USERY 204b | Y 206f |
| XXXXXXXX 202b | XXXX.EFGH.PRIVILEGE1 168g | USERX 204a | Y 206g |
| XXXXXXXX 202b | XXXX.EFGH.PRIVILEGE2 168h | USERX 204a | Y 206h |
| XXXXXXXX 202b | XXXX.EFGH.PRIVILEGE3 168i | USERX 204a | Y 206i |

*FIG. 2A*

| OBJECT NAME | USER 204 | PRIVILEGE1 212a | PRIVILEGE2 212b | PRIVILEGE3 212c |
|---|---|---|---|---|
| ABCD | USERX 204a | Y 206a | N 206c | Y 206d |
| ABCD | USERY 204b | N 206b | N 206e | Y 206f |
| EFGH | USERX 204a | Y 206g | Y 206h | Y 206i |

*FIG. 2B*

SYSTEM FOR PROVIDING USER PRIVILEGE INFORMATION ASSOCIATED WITH SECURED DATA

TECHNICAL FIELD

This invention relates to a system and method for providing user privilege information associated with an object of a database.

BACKGROUND

Banks, financial institutions, and other businesses use database management systems for monitoring, managing, and securing data. Currently, user privilege information associated with objects of databases is stored in various formats across multiple systems. Storing user privilege information in various formats across multiple systems often requires subject matter expertise of each system. In addition, some of the user privilege information may be stored in user privilege records that may be complex and difficult to access and interpret.

SUMMARY

According to embodiments of the present disclosure, disadvantages and problems associated with previous data management security systems may be reduced or eliminated.

According to one embodiment of the present invention, a system receives a request for user privilege information associated with an object of a first database. The system determines a class of a second database that corresponds to the object and accesses user privilege records that the second database associates with the class. The system determines a subset of the user privilege records that correspond to a selected user. Each of the subset of user privilege records comprise a privilege and a user privilege value indicating whether the selected user is authorized for that privilege. The subset of user privilege records are consolidated into a privilege matrix comprising a first axis listing the selected user, a second axis listing the privileges, and for each intersection of selected user and privilege, a corresponding user privilege value determined from the subset of user privilege records. The system communicates the privilege matrix in response to the request.

Certain embodiments of the invention may provide one or more technical advantages. A technical advantage of one embodiment is reconciling a large number of user privilege records from one or more sources into a centralized database for users by consolidating user privilege records associated with a selected user into a privilege matrix. Providing a consolidated view of user privilege information in a standard presentation layer results in a user-friendly privilege matrix that identifies one or more selected users' privileges associated with one or more objects. Another technical advantage of an embodiment includes associating, linking, and/or consolidating additional user privilege information into the privilege matrix, such as a RACF rules used to determine user privilege values, RACF rules governing privileges, the user privilege records and/or object records consolidated into the privilege matrix, and other suitable data, for managing, monitoring, securing, or other similar purposes. Yet another technical advantage of an embodiment may include reducing or eliminating the dependency for special knowledge of multiple systems by formatting a privilege matrix according to a standard format that users easily understand. An additional technical advantage of one embodiment may include providing a user-friendly tool for users to query authorization details and other user privilege information associated with objects of a database.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and for further features and advantages thereof, reference is now made to the following description taken in conjunction with the accompanying drawings, in which:

FIG. 2A illustrates an example of a logical view of a user privilege record stored in an example database of security manager (e.g., stored by IBM in a RACF database);

FIG. 2B illustrates an example of a logical view of a privilege matrix communicated to a user and/or stored in an example database of server memory (e.g., a privilege matrix that an example system created by consolidating data from multiple databases);

DETAILED DESCRIPTION

Embodiments of the present invention and its advantages are best understood by referring to FIGS. 1 through 4 of the drawings, like numerals being used for like and corresponding parts of the various drawings.

Banks, financial institutions, and other businesses use database management systems (DBMS) for monitoring, managing, and securing data. Currently, user privilege information associated with objects of databases is stored in various formats across multiple systems. Storing user privilege information in various formats across multiple systems often requires subject matter expertise of each system. In addition, some of the user privilege information may be stored in user privilege records that may be complex and difficult to access and interpret. The teachings of this disclosure recognize that it would be desirable to consolidate user privilege records from multiple systems into a privilege matrix that may be presented to users in a standard presentation layer, and that may be stored in a centralized database for users. FIGS. 1 through 4 below illustrate a system and method of consolidating user privilege records associated with one or more selected users and/or one or more objects associated with a database into a privilege matrix and communicating the privilege matrix to users and/or databases for storage.

Figure 1:
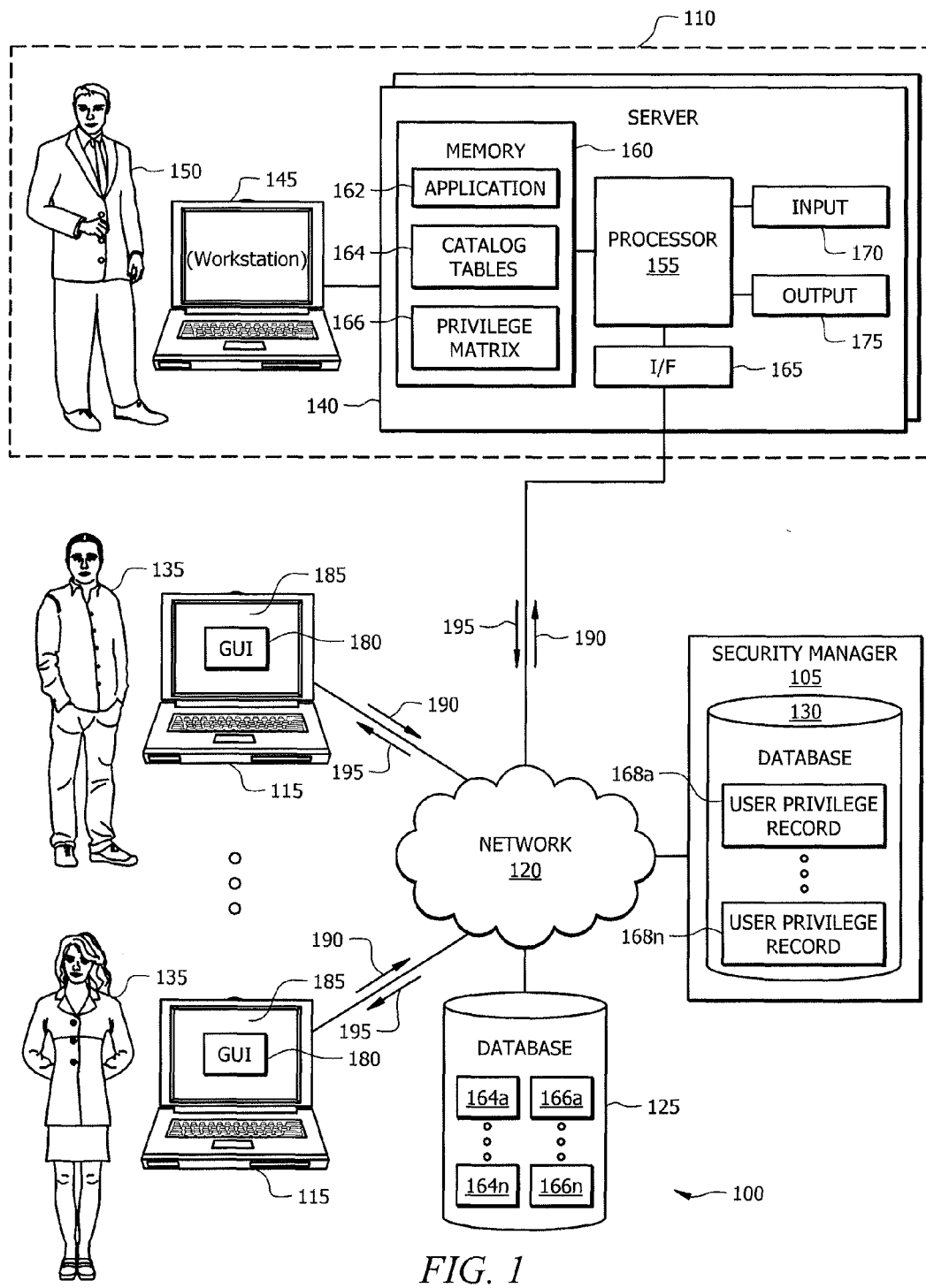
FIG. 1 illustrates an example system that consolidates user privilege information into a privilege matrix for users.

FIG. 1 illustrates an example system 100 that consolidates user privilege information into a privilege matrix for users according to certain embodiments. System 100 may include a security manager 105 configured with a database 130 (e.g., a RACF database), an enterprise 110, one or more clients 115, a network 120, a database 125 (e.g., an IBM DB2 database), one or more users 135, and one or more servers 140. Security manager 105, enterprise 110, clients 115, and database 125 may be communicatively coupled by network 120. Enterprise 110 is generally operable to provide a privilege matrix 166, such as the privilege matrix 166 shown in FIG. 2B. To provide privilege matrix 166, particular embodiments of enterprise 110 read privilege records from database 130 and read object records from database 125, and then reformat and present the information as privilege matrix 166, as described below.

An enterprise 110 may desire to provide a secure system environment to prevent or inhibit unauthorized users from accessing security information stored in, for example, database 125 and/or database 130. To provide such an environment, enterprise 110 may utilize multiple systems, such as database management systems and security systems, to secure the security information and/or any other suitable data. Security information may include database objects, such as databases, table spaces, tables, buffer pools, collections, columns, indexes, Java archives (JAR), packages, plans, roles, schemas, sequences, storage groups, stored procedures, stored protocols, systems, trusted contexts, user-defined distinct types, user-defined functions (UDF), views, and so on, and/or data associated with any of the preceding.

Security information also may include database privileges. Privileges may refer to authorizations (and other types of permissions) that may allow a database user, such as a user 135, to perform particular actions, operations, and/or types of tasks against various objects secured by system 100. Example privileges associated with an object may include the privilege to access, alter, archive, bind, copy, create, delete, display, drop, execute, image copy, explain, index, insert, load, modify, monitor, recover, reference, reorganize, repair, select, start, stats, stop, trace, trigger, update, usage, use, and/or any other privilege suitable for a particular purpose.

User privilege information associated with secured objects is generally stored in one or more databases of system 100. Administrators, employees, or other users associated with enterprise 110 may wish to access user privilege information. For example, a user 135 may request user privilege information associated with a particular object to determine if a particular user is authorized to access and/or control that object. As another example, a user may request user privilege information associated with particular objects to determine which users have been granted privileges, authorizations, or other permissions to perform certain actions, operations, and/or tasks against those objects. However, the user privilege information may be stored in various formats across multiple systems and/or databases.

In general, enterprise 110 accesses and consolidates the requested user privilege information into a privilege matrix 166 that may be formatted according to a particular format. As an example embodiment, enterprise 110 may first receive a request 190 associated with an object of a database, such as an object stored and managed by database 125 and defined in one or more catalog tables 164 of database 125. Request 190 may indicate one or more users and/or one or more objects of a database for which user privilege information is desired. In response to request 190, enterprise 110 may access user privilege information. In particular, enterprise 110 may read object records, such as catalog tables 164, that database 125 associates with the object and read privilege records, such as user privilege records 168, that a security system, such as a security manager 105 providing access control to objects of database 125, associates with the object. Enterprise 110 may then consolidate the object records (which may be interchangeably referred to as "catalog tables 164") and a subset of user privilege records 168 that correspond to one or more selected users into a privilege matrix 166 and communicate privilege matrix 166 to user 135 and/or database 125 for storage. Privilege matrix 166 may be communicated in a format that allows a user 135 to easily interpret the requested user privilege information.

Enterprise 110 generally utilizes a security manager 105 to control access to objects of database 125 and store user privilege information, such as user privilege records 168, associated with protecting those objects. Security manager 105 may be configured with a database 130 (e.g., a Resource Access Control Facility (RACF®) database) and may be implemented using any suitable combination of hardware, firmware, and software. In certain embodiments, security manager 105 may refer to security management software, such as RACF®, or any other suitable security system. Security manager 105 may include any suitable type of computer system, such as a network server, any remote server, a mainframe, a workstation, a web space server, a personal computer, a file server, a virtual device, or any other device that may control access to objects, such as objects defined in one or more catalog tables 164 of database 125. The functions of security manager 105 may be performed by any combination of one or more servers or other components at one or more locations. In the embodiment where the module is a server, the sever may be a private server, and the server may be a virtual or physical server. The server may include one or more servers at the same or remote locations. Also, security manager 105 may include any component that functions as a server.

Security manager 105 may represent any suitable set of instructions, logic, or code embodied in a computer readable storage medium that may be configured to control access to data managed by database 125. For example, security manager 105 may determine whether a user 135 is allowed to access objects of database 125 based at least in part upon user privilege records 168. As such, security manager 105 may protect against unauthorized access to objects or other data managed by database 125. In certain embodiments, security manager 105 may allow enterprise 110 and/or user 135 to access user privilege records 168. For example, enterprise 110 may request user privilege records 168 associated with an object defined in database 125 from security manager 105. In response, security manager 105 may determine a class that security manager 105 associates with that object and retrieve user privilege records 168 associated with that class for that object.

Although FIG. 1 illustrates security manager 105 as being a separate component from the other components of FIG. 1, in certain embodiments, security manager 105 may be integrated with any of the other components of FIG. 1. As an example, security manager 105 may be integrated with an enterprise 110, a server 140, and/or a database 125. In such an example, instructions, logic, or code associated with security manager 105 may be stored in a memory of enterprise 110, server 140, and/or database 125. This may allow enterprise 110, server 140, and/or database 125 to perform one or more functions of security manager 105. As another example, security manager 105 may be integrated with an operating system of enterprise 110, database 125, and/or server 140.

RACF database 130 represents any components configured to store privilege records (e.g., user privilege records 168) associated with security manager 105. RACF database 130 may include a network server, any remote server, a mainframe, a host computer, a workstation, a web space server, a personal computer, a file server, a virtual device, or any other device that may store information managed by security manager 105. The functions of RACF database 130 may be performed by any combination of one or more servers or other components at one or more locations. In the embodiment where the module is a server, the server may be a private server, and the server may be a virtual or physical server. The server may include one or more servers at the same or remote locations.

In general, RACF database 130 stores user privilege information associated with objects that security manager 105 controls access to. RACF database 130 may store user privilege information in one or more user privilege records 168, such as user privilege records 168a through 168n. User privilege information stored in a user privilege record 168 may include a user identifier (identifying a particular user associated with user privilege record 168), a name of a class corresponding to an object (e.g. the class that security manager 105 associates with the object of database 125), a RACF profile that maps a privilege associated with the object (a specific function to be taken on the object), a user privilege value for the privilege (indicating whether the user is authorized to perform that function on that object), and/or any other suitable data. As shown in FIG. 2A, RACF database 130 may store user privilege records 168 according to a RACF format. In such embodiments, user privilege records 168 may be complex, incomplete, and difficult for a user 135 to interpret (e.g., a user 135 may not be familiar with RACF, a user privilege record 168 does not contain a database object name, etc.). In certain embodiments, user privilege records 168a through 168n may be based on an architecture provided by IBM.

Although system 100 illustrates RACF database 130 as being integrated with security manager 105, database 130 may be a separate component from other components of FIG. 1 or may be integrated with any other components of FIG. 1.

Enterprise 110 generally utilizes client 115 and server 140 to provide user privilege information in response to requests 190. User privilege information may include authorization details associated with user access to objects such as databases, table spaces, tables, columns, views, plans, packages, collections, stored protocols, indexes, storage groups, sequences, buffer pools, and so on. A request 190 may be a user-generated request that is received from a user 135, in certain embodiments. In such an example, user 135 may be a financial institution employee conducting an audit or other security analysis of system 100. Alternatively, request 190 may be a system-generated request that is automated by one or more components of system 100 that are configured to communicate a request 190, for example, once a day, week, month, and so on. In such an example, the automated request may cause server 140 to access object records and user privilege records 168, transform a subset of user privilege records 168 that correspond to a particular user 135 and the respective object records into a privilege matrix 166, and store privilege matrix 166 in database 125. In certain embodiments, request 190 may request user privilege information associated with multiple objects, object types, and/or users 135.

Client 115 may be configured to communicate requests 190 from users 135 and receive privilege matrices 166 from server 140. As such, user 135 may utilize client 115 to interact with server 140 to request user privilege information associated with a particular object of database 125. Client 115 may refer to any device that enables user 135 to interact with server 140 to query user privilege information and that may display information to user 135. In certain embodiments, client 115 may include a computer, workstation, telephone, Internet browser, electronic notebook, Personal Digital Assistant (PDA), pager, or any other suitable device (wireless, wireline, or otherwise), component, or element capable of receiving, processing, storing, and/or communicating information with other components of system 100. Client 115 may also include any suitable user interface such as a display 185, microphone, keyboard, or any other appropriate terminal equipment usable by user 135. It will be understood that system 100 may comprise any number and combination of clients 115 and users 135.

Client 115 may allow a user 135 to receive privilege matrix 166 via report 195 in response to request 190. For example, server 140 may utilize client 115 to communicate report 195 to user 135. In certain embodiments, client 115 may further allow user 135 to request that report 195 be formatted according to a basic format or formatted according to an enhanced format. A report 195 that is formatted according to a basic format may include multiple records each containing (1) a name of the object of database 125 and a corresponding privilege (e.g., any data included in a privilege matrix 166 and/or any other suitable data); and/or (2) RACF information corresponding to the object for which user privilege information is requested (e.g., data associated with RACF conditional access, a RACF profile or rule associated with user privilege record 168 and used to determine a user privilege value for a privilege associated with the object, and/or any other suitable data associated with user privilege record 168). In certain embodiments, the basic format may be quickly accessed by server 140 and may be CPU friendly.

A report 195 that is formatted according to an enhanced format may refer to a SYS*AUTH format associated with DB2. In such embodiments, a report 195 may include a privilege matrix 166 that is formatted according to a SYS*AUTH format associated with DB2 such that each row of privilege matrix 166 includes a user identifier, an object name, one or more privileges associated with an object, and user privilege values indicating whether a selected user is authorized for the respective one or more privileges. In certain embodiments, the enhanced format may be DB2 user-friendly.

Client 115 may include a graphical user interface (GUI) 180, in certain embodiments. GUI 180 is generally operable to tailor and filter data presented to user 135. GUI 180 may provide user 135 with an efficient and user-friendly presentation of user privilege information consolidated into privilege matrix 166. GUI 180 may display privilege matrix 166 in real time or near real time (e.g., real time plus the time associated with accessing, consolidating, formatting, and communicating the information). In such an example, user 135 may request the user privilege information directly from enterprise 110, and the user privilege information consolidated into privilege matrix 166 may be provided in real time or near real time. GUI 180 may further display historical (or non-real time) user privilege information. In such an example, user 135 may request user privilege information stored in database 125, and the user privilege information consolidated into privilege matrix 166 and stored in database 125 may be provided. GUI 180 may display privilege matrix 166 in any configuration and may display any number of interfaces that allow user 135 to navigate through various representations of user privilege information. Furthermore, GUI 180 may be configured by user 135 in any manner to display privilege matrix 166.

GUI 180 may include a plurality of displays having interactive fields, pull-down lists, and buttons operated by user 135. For example, GUI 180 may include a display having interactive fields that allows a user 135 to select a format, such as a basic or enhanced format, for report 195. In such an example, user 135 may choose a format for report 195 that includes multiple records each including a name of the object of database 125 and a corresponding privilege, object records from a DB2 database (e.g., database 125), user privilege records 168 from a RACF database (e.g., database 130), RACF information corresponding to the object for which user privilege information is requested, and/or object records and user privilege records 168 consolidated into privilege matrix 166 (which may be consolidated and formatted according to a DB2 format). As another example, GUI 180 may include interactive fields, pull-down lists, and buttons that may allow a user 135 to select various search criteria for user privilege information, such as selecting one or more users, one or more objects, one or more RACF rules, one or more RACF classes, and/or one or more RACF profiles. In certain embodiments, GUI 180 may display a list of object names retrieved from object records (e.g., catalog tables 164 that describe the objects defined in and managed by database 125) to user 135, thereby allowing user 135 to select one or more objects for which to query user privilege information.

GUI 180 may be customized to leverage DBMS or SQL strength to analyze a stored privilege matrix 166 (and/or a DB2 DBMS copy of the user privilege information) for exhaustive analysis (e.g., generate a report listing users that are authorized for a particular privilege). In certain embodiments, GUI 180 may provide a common integrated view of user privilege records 168 and/or catalog tables 164. GUI 180 also may facilitate querying user privilege information and the corresponding rules associated with security manager 105 and/or database 125 used to access user privilege records 168 and determine user privilege values. It should be understood that the term GUI 180 may be used in the singular or in the plural to describe one or more GUIs 180 and each of the displays of a particular GUI 180.

Enterprise 110 generally utilizes database 125 (e.g., an IBM Database 2 (DB2®) database) to manage and store data associated with enterprise 110, such as objects defined in catalog tables 164 (e.g., object records) and user privilege information consolidated into privilege matrices 166. Database 125 may include a network server, any remote server, a mainframe, a host computer, a workstation, a web space server, a personal computer, a file server, a virtual device, or any other device that may store information. The functions of database 125 may be performed by any combination of one or more servers or other components at one or more locations. In the embodiment where the module is a server, the server may be a private server, and the server may be a virtual or physical server. The server may include one or more servers at the same or remote locations. In certain embodiments, database 125 may refer to any suitable device communicatively coupled to network 120 and capable of storing and facilitating retrieval of data and/or instructions. Examples of database 125 include computer memory (for example, Random Access Memory (RAM) or Read Only Memory (ROM)), removable storage media (for example, a Compact Disk (CD) or a Digital Video Disk (DVD)), database and/or network storage (for example, a server), and/or any other volatile or non-volatile, non-transitory computer-readable memory devices that store one or more files, lists, tables, or other arrangements of information. Database 125 may store any data and/or instructions utilized by server 140.

In certain embodiments, database 125 may refer to a relational database management system (DBMS). In certain embodiments, database 125 may perform any suitable function for system 100, for example, data warehousing, data management, and data provisioning on platforms such as DB2 or any other suitable technology platform. In certain embodiments, database 125 may also secure data associated with enterprise 110.

In addition to storing catalog tables 164 and privilege matrices 166, database 125 may further provide the information for view by a user, such as user 135. For example, user 135 may send a message to database 125 that requests particular information from database 125. As such, database 125 may gather such information and communicate it for view by user 135 on client 115.

Although FIG. 1 illustrates database 125 as being a separate component from the other components of FIG. 1, in certain embodiments, database 125 may be integrated with any of the other components of FIG. 1. Furthermore, although FIG. 1 illustrates database 125 as being connected to network 120, in certain embodiments, database 125 may be connected to any component of system 100.

Catalog tables 164, such as catalog tables 164*a* through 164*n*, generally refer to object records and include any data associated with objects that database 125 is managing and/or storing and that may be stored in one or more related files in one or more databases. For example, catalog tables 164 may include data identifying and describing various objects that have been defined in database 125, such as object names, privileges associated with defined objects (e.g., specific functions associated with objects that may be performed by authorized users), any other data describing objects of database 125, any other information associated with managing objects of database 125, and/or any combination of the preceding. In certain embodiments, catalog tables 164 may describe the physical and logical structure of the data managed and stored in database 125. In certain embodiments, catalog tables 164*a* through 164*n* may be based on an architecture provided by IBM.

In certain embodiments, one or more rows of a catalog table 164 may describe a particular object and how it is related to other objects managed by database 125. In such embodiments, when an object of database 125 is created, altered, or deleted, the one or more rows of catalog table 164 describing the object may be inserted, updated, or deleted, respectively. In certain embodiments, catalog tables 164 may refer to a set of DB2 tables containing information about the objects defined and managed by database 125. For example, catalog tables 164 may be SYS*AUTH tables that DB2 uses for storing data describing DB2 object privileges of database 125 if, for example, another security manager 105 is not implemented. As such, each row in a catalog table 164 may identify a DB2 object name and the corresponding privileges (e.g., specific functions that may be taken on an object).

Privilege matrices 166 generally include user privilege information associated with one or more objects managed by database 125 and protected by security manager 105. Privilege matrices 166*a* through 166*n* may be stored in any suitable location. For example, privilege matrices 166*a* through 166*n* may optionally be stored in one or more related files in database 125 for offline analysis, as shown in FIG. 1. In addition, or in the alternative, privilege matrices 166*a* through 166*n* may be stored in memory outside of database 125, such as a memory 160 of a server 140. In certain embodiments, privilege matrices 166*a* through 166*n* may be custom components configured to interface and/or function with the IBM architecture.

A privilege matrix 166 may include a consolidated subset of user privilege records 168 that correspond to one or more selected users, catalog tables 164, and/or any other user privilege information. For example, user privilege information consolidated into privilege matrix 166 may include data from user privilege records 168 (e.g., user identifiers, RACF profiles that govern the privileges associated with objects and their corresponding user privilege values, etc.) and catalog tables 164 (e.g., object names, etc.) that has been added to or updated in privilege matrix 166. Thus, privilege matrix 166 may refer to a centralized view of a spectrum of user privilege information.

Each privilege matrix 166 may include a first axis that lists a selected user, a second axis that lists the privileges associated with a selected object of database 125, and for each intersection of selected user and privilege, a corresponding user privilege value determined from a subset of user privilege records 168. In certain embodiments, the first axis may refer to one or more headings of one or more rows of a table and the second axis may refer to one or more headings of one or more columns of the table. Thus, privilege matrix 166 generally identifies the privileges associated with particular objects and particular users. In certain embodiments, catalog tables 164 and user privilege records 168 are consolidated into privilege matrices 166 that are formatted according to a DB2 format. As such, privilege matrix 166 may stored and/or communicated in a standard presentation layer. An advantage of this embodiment may include reducing or eliminating the dependency and need for special knowledge related to how multiple systems store user privilege information.

Although FIG. 1 describes privilege matrix 166 as including consolidated catalog tables 164 that correspond to a particular object and user privilege records 168 that correspond to the particular object and a selected user, the present disclosure contemplates privilege matrix 166 as including consolidated catalog tables 164 and user privilege records 168 that correspond to any number of objects and/or users. For example, server 140 may access and consolidate catalog tables 164 and user privilege records 168 associated with multiple objects and/or that correspond to multiple users into a privilege matrix 166. In such an example, each row of privilege matrix 166 may refer to a different user and/or object.

Security manager 105, clients 115, database 125, servers 140, and other components of system 100 may be communicatively coupled by network 120. In certain embodiments, network 120 may refer to any interconnecting system capable of transmitting audio, video, signals, data, messages or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

Enterprise 110 generally facilitates reading catalog tables 164 from database 125 and user privilege records 168 from RACF database 130 in response to receiving a request 190 for user privilege information associated with an object of database 125 and consolidating catalog tables 164 and user privilege records 168 into privilege matrix 166. Enterprise 110 represents any components that may communicate with security manager 105, clients 115, database 125, RACF database 130, and/or any other devices connected to network 120. Enterprise 110 may include a network server, any remote server, a mainframe, a host computer, a workstation, a web space server, a personal computer, a file server, a virtual device, or any other device that may communicate with the devices connected to network 120. The functions of enterprise 110 may be performed in any combination of one or more servers or other components at one or more locations. In the embodiment where the module is a server, the server may be a private server, and the server may be a virtual or physical server. The server may include one or more servers at the same or remote locations.

In certain embodiments, enterprise 110 may refer to a financial institution such as a bank and may include one or more servers 140, an administrator workstation 145, and an administrator 150. In certain embodiments, server 140 may refer to any suitable combination of hardware and/or software implemented in one or more modules to process data and provide the described functions and operations. In certain embodiments, the functions and operations described herein may be performed by a pool of servers 140. In certain embodiments, server 140 may include, for example, a mainframe, server, host computer, workstation, web server, file server, a personal computer such as a laptop, or any other suitable device operable to process data. In certain embodiments, server 140 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems.

In general, server 140 facilitates providing user privilege information associated with objects of database 125. Server 140 may communicate with security manager 105 (including RACF database 130), clients 115, database 125, and/or any other devices connected to network 120. For example, server 140 may receive a request 190 for user privilege information associated with an object of a database 125. In response to receiving request 190, server 140 may instruct and/or command database 125 and/or RACF database 130 to provide user privilege information associated with one or more objects and/or one or more users 135. Server 140 may then consolidate certain user privilege information (such as information from catalog tables 164 corresponding to one or more objects and/or user privilege records 168 corresponding to one or more selected users) into a privilege matrix 166 to be communicated to user 135 and/or database 125 for storage.

In certain embodiments, server 140 may receive request 190 from user 135. Alternatively, server 140 may receive request 190 from an automated system, process, or tool that generates and communicates request 190 to server 140. For example, server 140 may be configured to generate an automated request 190 for user privilege information associated with one or more objects and/or one or more users 135 once per hour, day, week, month, and so on. Request 190 may identify a particular object of database 125 for which user privilege information is desired. Request 190 may also identify a particular user for which user privilege information is desired. The present disclosure contemplates that request 190 may be associated with any number of objects and users 135. For example, a user 135 may want to receive user privilege information associated with two objects, three objects, ten objects, and so on. As another example, a user 135 may want to receive user privilege information associated with that user and/or another user, two other users, three other users, ten other users, and so on.

In certain embodiments, server 140 may determine whether a user 135 communicating request 190 is authorized to receive the user privilege information associated with the object. To do so, server 140 may prompt user 135 to input user credentials before communicating request 190. User credentials may be the user's name, a username, a password, an account name, a personal identification number, a private key, a social security number, a credit card number, any combination thereof, or any other information that can authenticate a user 135. Server 140 may then determine, based at least in part upon the user credentials, whether user 135 is authorized to receive the user privilege information. For example, server 140 may compare user credentials associated with request 190 against user credentials associated with user 135 (which may be contained in, for example, database 125 and/or database 130) to determine whether user 135 is authorized to receive the user privilege information. In such embodiments, user credentials may be communicated with request 190 or may be communicated separately from request 190.

In certain embodiments, before communicating request 190, a user 135 may request a list identifying objects of database 125. In response, server 140 may use catalog tables 164 (e.g., object records) to determine objects defined and managed by database 125. Server 140 may then retrieve the corresponding object names from catalog tables 164 and use client 115 to display the list of object names identifying the objects to user 135. As such, user 135 may select an object from the list to generate a request 190 for user privilege information associated with the selected object.

Upon receiving request 190, server 140 may access and read one or more catalog tables 164 associated with the selected object from database 125. Server 140 then may determine, based at least in part upon the object identified in request 190 and/or the one or more catalog tables 164, a class of RACF database 130 that corresponds to the object of database 125 and/or possible functions (e.g., privileges) for that object. Generally, the object (e.g., table, database, user defined function, etc.) of database 125 (e.g., a DB2 database) maps to a RACF class of RACF database 130. In certain embodiments, server 140 may deploy RACF macros (e.g., RACROUTE) to query profiles that security manager 105 uses to protect the selected object and its corresponding privileges. For example, a user may create certain input arguments and use keywords to retrieve, by server 140, user privilege information for the selected object. In certain embodiments, RACROUTE may be a macro supplied by IBM to communicate with security manager 105 (e.g., RACF).

Server 140 generally accesses and reads user privilege records 168 from RACF database 130 that security manager 105 associates with the class (and that thereby correspond to the particular object). In certain embodiments, user privilege records 168 are accessed by server 140 in real-time. Server 140 may then determine a subset of user privilege records 168 that correspond to a selected user (e.g., a particular user identified in request 190). As an example, server 140 may determine one or more user privilege records 168 that correspond to the selected user. In such an example, server 140 may do so based at least in part upon a user identifier (e.g., a user identifier associated with a user privilege record 168 and/or request 190). In certain embodiments, a selected user may be a user 135 that requested the user privilege information or another user for which user privilege information is desired.

In general, server 140 consolidates the subset of user privilege records 168 that correspond to a selected user and the respective catalog tables 164 into a privilege matrix 166. Server 140 also may communicate privilege matrix 166. In certain embodiments, server 140 communicates and/or stores privilege matrix 166 in a RDBMS table for offline analysis. Privilege matrix 166 is generally communicated to a user 135 via report 195. Server 140 may communicate report 195 in any suitable format. For example, report 195 may be formatted according to a basic format or an enhanced format. In such an example, report 195 may be communicated in a format similar to a known DB2 catalog authorization table such that each row of privilege matrix 166 includes a user identifier, an object name, privileges associated with an object, and user privilege values indicating whether a selected user is authorized for the respective privileges. As a further example, server 140 may communicate report 195 to user 135 (and/or database 125 for storage) in a tabular format that allows user 135 to easily identify one or more privileges associated with one or more objects of database 125. In such an example, a tabular format may also allow user 135 to navigate through different interfaces and/or views of privilege matrix 166.

In addition to privilege matrix 166, report 195 may include any other suitable information, such as any of the following: one or more catalog tables 164; various data associated with catalog tables 164 (e.g., object names, privilege names, etc.); one or more user privilege records 168; various data associated with user privilege records 168 (e.g., a name of a class corresponding to a particular object, data associated with conditional access, a RACF member profile that controls access to the particular object, a group profile, a user ID, a profile owner, a user attribute (indicating whether a user can perform certain operations and/or tasks, such as modify a user privilege record 168), security classification, and so on); one or more RACF rules used to determine user privilege values; user privilege information associated with other objects of database 125; user privilege information associated with other selected users; any other data associated with user privilege information; and/or any combination of the preceding.

As described above, server 140 may communicate privilege matrix 166 to database 125 for storage. After storing a privilege matrix 166 in database 125, server 140 may retrieve stored privilege matrix 166 from database 125 and communicate it to a user 135 and/or an administrator 150. For example, server 140 may first store privilege matrix 166 in database 125. Subsequently, server 140 may receive a request 190, from user 135 and/or administrator 150, for the user privilege information consolidated into privilege matrix 166. In response to request 190, server 140 may retrieve stored privilege matrix 166 and communicate it to user 135 and/or administrator 150. This may allow a user 135 and/or an administrator 150 to perform offline analysis and impact analysis.

According to some embodiments, server 140 may link privilege matrix 166 to the subset of user privilege records 168 and/or catalog tables 164 consolidated into privilege matrix 166. For example, server 140 may receive a request for the subset of user privilege records 168 and/or catalog tables 164 used to create privilege matrix 166. The request may be included in request 190 or may be communicated independently from request 190. In response, server 140 may link privilege matrix 166 to the respective subset of user privilege records 168 and/or catalog tables 164 and communicate the linked subset of user privilege records 168 via report 195.

As mentioned above, server 140 may be utilized by user 135 and/or administrator 150 to perform impact analysis (e.g., a "what-if" analysis), in certain embodiments. Specifically, server 140 may be configured to analyze, based at least in part upon certain standard rules associated with security manager 105 (such as RACF rules), catalog tables 164, privilege matrices 166, and/or user privilege records 168 to determine any of the following: (1) if a new RACF member profile of security manager 105 is created, which objects of database 125 are affected and which users 135 have access to those objects; (2) if an existing profile of security manager 105 (such as an existing user privilege record 168) is deleted, which objects and users are affected; (3) if a new object of database 125 is created, which profiles of security manager 105 (such as user privilege records 168) will be effective and which users will have access or other privileges associated with the new object; (4) which profiles of security manager 105 (such as user privilege records 168) will be effective for future objects of database 125; (5) the impact of creating or deleting profiles of security manager 105 (such as creating or deleting user privilege records 168); (6) any other suitable information; and/or (7) any combination of the preceding. For example, an existing RACF profile (e.g., D92T.ABC*.ACCOUNT_TAB*.DELETE) may control a user's delete access to a table (e.g., ABC01.ACCOUNT_TABLE01). If an administrator wishes to create a new profile (e.g., D92T.ABC*.ACCOUNT_TABLE*.DELETE for a particular purpose, the administrator could use the what-if analysis to determine whether the old profile or new profile will be effective without creating the new profile. As such, wrong definitions and security errors may be avoided. As another example, the administrator could use the what-if analysis to determine whether the existing RACF profile would protect a new table (e.g., ABC02.ACCOUNT_TABLE) without creating the new table.

Server 140 may include a processor 155, a server memory 160, an interface 165, an input 170, and an output 175. Server memory 160 may refer to any suitable device capable of storing and facilitating retrieval of data and/or instructions. Examples of server memory 160 include computer memory (e.g., RAM or ROM), mass storage media (e.g., a hard disk), removable storage media (e.g., a CD or a DVD), database and/or network storage (e.g., a server), and/or any other volatile or non-volatile, non-transitory computer-readable memory devices that store one or more files, lists, tables, or other arrangements of information. Although FIG. 1 illustrates server memory 160 as internal to server 140, it should be understood that server memory 160 may be internal or external to server 140, depending on particular implementations. Also, server memory 160 may be separate from or integral to other memory devices to achieve any suitable arrangement of memory devices for use in system 100.

Server memory 160 is generally operable to store an application 162, catalog table 164, and privilege matrix 166. Application 162 generally refers to logic, rules, algorithms, code, tables, and/or other suitable instructions for performing the described functions and operations. In certain embodiments, application 162 facilitates reading catalog tables 164 associated with objects from database 125, correlating user privilege records 168 to the objects of database 125, consolidating catalog tables 164 and user privilege records 168 into privilege matrices 166, and communicating privilege matrices 166 to users 135 via reports 195.

Server memory 160 communicatively couples to processor 155. Processor 155 is generally operable to execute application 162 stored in server memory 160 to generate and communicate privilege matrix 166 according to the disclosure. Processor 155 may comprise any suitable combination of hardware and software implemented in one or more modules to execute instructions and manipulate data to perform the described functions for servers 140. In certain embodiments, processor 155 may include, for example, one or more computers, one or more central processing units (CPUs), one or more microprocessors, one or more applications, and/or other logic.

Communication interface 165 (I/F) may be communicatively coupled to processor 155 and may refer to any suitable device operable to receive input for server 140, send output from server 140, perform suitable processing of the input or output or both, communicate to other devices, or any combination of the preceding. Communication interface 165 may include appropriate hardware (e.g., modem, network interface card, etc.) and software, including protocol conversion and data processing capabilities, to communicate through network 120 or another communication system, which allows server 140 to communicate to other devices. Communication interface 165 may include any suitable software operable to access data from various devices such as security manager 105, clients 115, and/or database 125. Communication interface 165 may also include any suitable software operable to transmit data to various devices such as security manager 105, clients 115, and/or database 125. Communication interface 165 may include one or more ports, conversion software, or both. In general, communication interface 165 receives a request 190 from user 135 and/or from an automated process, and transmits privilege matrix 166 via report 195 to client 115.

In certain embodiments, input device 170 may refer to any suitable device operable to input, select, and/or manipulate various data and information. Input device 170 may include, for example, a keyboard, mouse, graphics tablet, joystick, light pen, microphone, scanner, or other suitable input device. Output device 175 may refer to any suitable device operable for displaying information to a user. Output device 175 may include, for example, a video display, a printer, a plotter, or other suitable output device.

In general, administrator 150 may interact with server 140 using an administrator workstation 145. In certain embodiments, administrator workstation 145 may be communicatively coupled to server 140 and may refer to any suitable computing system, workstation, personal computer such as a laptop, or any other device operable to process data. In certain embodiments, administrator 150 may utilize administrator workstation 145 to manage server 140 and any of the data stored in server memory 160 and/or database 125. For example, administrator 150 may manually force consolidating certain user privilege information included in one or more catalog tables 164 and/or one or more user privilege records 168 into privilege matrix 166. As another example, administrator 150 may configure server 140 to automatically request user privilege information associated with one or more objects and corresponding to one or more users 135. This may cause server 140 to access catalog tables 164 and user privilege records 168 responsive to the request, consolidate catalog tables 164 and user privilege records 168 into one or more privilege matrices 166, and store one or more privilege matrices 166 in database 125.

In operation, application 162, upon execution by processor 155, facilitates consolidating catalog tables 164 that correspond to a selected object and user privilege records 168 that correspond to a selected user into privilege matrix 166 and communicating privilege matrix 166 to users 135 and/or database 125. To provide privilege matrix 166, application 162 may first receive a request 190 for user privilege information associated with an object of database 125. For example, application 162 may receive a request 190 from a user 135 and/or an automated request 190 from one or more components of system 100. Request 190 may indicate one or more objects for which user privilege information is requested. Request 190 also may include one or more user identifiers indicating one or more users for whom user privilege information is being requested. Examples of user identifiers include a user name, social security number, date of birth, unique party identifier (e.g., a unique identifier assigned by the enterprise to identify the user), and so on.

In certain embodiments, application 162 may determine whether a user 135 communicating request 190 is authorized to receive the requested user privilege information. Application 162 may do so by prompting user 135 to input user credentials and determining, based at least in part upon the user credentials, whether user 135 is authorized to receive the requested user privilege information.

In response to request 190, application 162 may read catalog tables 164 that correspond to the object from database 125 and determine a class of security manager 105 that corresponds to the object of database 125. For example, application 162 may map, based at least in part upon data of one or more catalog tables 164, the selected object of database 125 to the corresponding class of RACF database 130 of security manager 105. In certain embodiments, application 162 may do so using one or more RACF macros.

Application 162 may then access, based at least in part upon the determined class, user privilege records 168 that security manager 105 associates with the class. In certain embodiments, application 162 may retrieve and/or read user privilege records 168 from RACF database 130. Each user privilege record 168 may correspond to a user and may include user privilege information indicating whether that user is authorized for a particular privilege associated with the object. For example, a user privilege record 168 may include any of the following: (1) an object name (e.g., a name of a database, table space, table, buffer pool, collection, column, index, Java archive (JAR), package, plan, role, schema, sequence, storage group, stored procedure, stored protocol, system, trusted context, user-defined distinct type, user-defined function (UDF), view, and so on); (2) a privilege (e.g., access, alter, archive, bind, copy, create, delete, display, drop, execute, image copy, explain, index, insert, load, modify, monitor, recover, reference, reorganize, repair, select, start, stats, stop, trace, trigger, update, usage, use, and so on); (3) a user privilege value (e.g., a value indicating whether the selected user is authorized for the privilege); (4) a class name (e.g., the name of the class that corresponds to the object associated with the privilege); (5) one or more authorization rules (e.g., authorization rules, such as RACF rules, of security manager 105 that application 162 used to determine the user privilege values); (6) a user identifier (e.g., identifying the user associated with the particular user privilege record 168); (7) any other information; and/or (8) any combination of the preceding.

Once application 162 accesses user privilege records 168, application 162 may determine a subset of user privilege records 168 that correspond to one or more selected users, such as one or more users identified in request 190. In certain embodiments, application 162 determines the subset of user privilege records 168 corresponding to one or more selected users based at least in part upon user identifiers included in user privilege records 168 and/or data included in catalog tables 164.

Application 162 may then consolidate the catalog tables 164 and the corresponding subset of user privilege records 168 into a privilege matrix 166. For example, application 162 may transform and format any suitable data included in catalog tables 164 and user privilege records 168, and present that data as privilege matrix 166. Privilege matrix 166 may comprise a first axis that lists one or more selected users, a second axis that lists one or more privileges associated with one or more objects of database 125, and for each intersection of a selected user and privilege, a corresponding user privilege value determined from the subset of user privilege records 168. Thus, privilege matrix 166 may identify the privileges associated with one or more objects and one or more selected users.

Application 162 communicates privilege matrix 166 in any suitable format. In certain embodiments, application 162 communicates privilege matrix 166 via report 195. Report 195 may comprise one or more privilege matrices 166, one or more catalog tables 164 linked to one or more privilege matrices 166, one or more user privilege records 168 linked to one or more privilege matrices 166, and/or one or more RACF rules associated with one or more privilege matrices 166. In certain embodiments, report 195 may have a standardized format comprising standardized fields. In such embodiments, a privilege matrix 166 communicated via report 195 may be formatted according to a format similar to a DB2 format, such as a SYS*AUTH format. Application 162 may also format report 195 according to a basic format or an enhanced format. As such, report 195 may be formatted in a tabular format that allows a user 135 to easily identify the privileges associated with the object and the respective user privilege values. In certain embodiments, application 162 may utilize one or more catalog tables 164 to populate and format privilege matrix 166.

Application 162 may communicate report 195 to a display or other user interface, or communicate it to a database for storage. As an example, application 162 may provide report 195 to user 135 by utilizing client 115. In certain embodiments, user 135 may utilize client 115 to receive report 195. For example, application 162 may communicate report 195 in response to user 135 requesting user privilege information associated with one or more objects of database 125. In certain embodiments, application 162 may communicate report 195 to administrator 150 by utilizing administrator workstation 145. In certain embodiments, application 162 may communicate a privilege matrix 166 stored in database 125. For example, in response to an automated request 190, application 162 may store privilege matrix 166 in database 125 (e.g., for offline analysis). Application 162 may then receive a subsequent request 190 for privilege matrix 166. In response to subsequent request 190, application 162 may retrieve privilege matrix 166 from database 125 and communicate privilege matrix 166 to a user 135. In such an example, user 135 may perform offline analysis and impact analysis.

Application 162 may also link privilege matrix 166 to the subset of user privilege records 168 and/or catalog tables 164 used to yield privilege matrix 166. For example, application 162 may receive a request for the subset of user privilege records 168 used to create privilege matrix 166. In response, application 162 may link privilege matrix 166 to the respective subset of user privilege records 168 and communicate the linked subset of user privilege records 168. The linked subset of user privilege records 168 and/or catalog tables 164 may be communicated separately from privilege matrix 166 or concurrently with privilege matrix 166, such as via report 195.

Application 162 may also be configured to associate privilege matrix 166 with a RACF rule used to determine a selected user's privileges and corresponding user privilege values. Application 162 may do so by determining, for example, the RACF profile rule that governs the object. Examples of RACF rules include rules for determining profiles using wildcards, rules for defining profiles for different DB2 objects and types of objects, rules for creating new profiles and determining whether those new profiles undercut or override existing profiles, rules for deleting profiles and determining which objects will be impacted and whether users will gain or lose access to the impacted objects via other existing profiles, rules for determining whether access to an object is controlled by DB2 or security manager 105, and so on.

Modifications, additions, or omissions may be made to system 100 without departing from the scope of the disclosure. Additionally, system 100 may include any number of security managers 105, enterprises 110, clients 115, networks 120, databases 125, and/or servers 140. Furthermore, any suitable logic may perform the functions of system 100 and the components within system 100.

FIG. 2A illustrates an example of a logical view of user privilege records 168 that may be stored in one or more related files in a RACF database (e.g., database 130). In certain embodiments, user privilege records 168 may be stored by IBM in the RACF database and/or may be based on an architecture provided by IBM. The database may comprise multiple user privilege records 168 (which may be interchangeably referred to as "profiles 168"), such as profiles 168a through 168n of RACF database 130. The database may store profiles 168 in any suitable format. In certain embodiments, the database may store profiles 168 according to a RACF format. A RACF format may use a naming convention that differs from that used by database 125. In such embodiments, profiles 168 may be complex and difficult for a user 135 to interpret.

Profiles 168 generally include data associated with user privilege information. For example, each profile 168 (e.g., profiles 168a through 168i) may include (1) a class 202 (e.g., class 202a and/or 202b) that corresponds to an object (e.g., object ABCD and/or object EFGH) of database 125; (2) a corresponding profile name (e.g., XXXX.ABCD.PRIVILEGE1 of profile 168a, XXXX.ABCD.PRIVILEGE1 of profile 168b, XXXX.ABCD.PRIVILEGE2 of profile 168c, XXXX.ABCD.PRIVILEGE3 of profile 168d, XXXX.ABCD.PRIVILEGE2 of profile 168e, XXXX.ABCD.PRIVILEGE3 of profile 168f, XXXX.EFGH.PRIVILEGE1 of profile 168g, XXXX.EFGH.PRIVILEGE2 of profile 168h, and/or XXXX.EFGH.PRIVILEGE3 of profile 168i); (3) a user identifier identifying a user 204 (e.g., USERX 204a and/or USERY 204b) that corresponds to a profile 168; and (4) a user privilege value 206 (which may be interchangeably referred to as "access 206") (e.g., user privilege values 206a, 206b, 206c, 206d, 206e, 206f, 206g, 206h, and/or 206i) indicating whether a user 204 is authorized for a particular privilege (e.g., PRIVILEGE1, PRIVILEGE2, PRIVILEGE3, etc.).

In certain embodiments, a user privilege value 206 may include a Y or a N (i.e., a yes or a no, respectively) to indicate whether a user 204 is authorized for a particular privilege associated with a particular object (e.g., authorized to access an object, modify an object, delete an object, perform any other suitable operation related to an object, and/or any combination of the preceding). For example, profile 168a indicates that a USERX 204a is authorized for PRIVILEGE1 associated with an object ABCD because user privilege value 206a is a Y. As another example, profile 168b indicates that a USERY 204b is not authorized for PRIVILEGE1 associated with object ABCD because user privilege value 206b is a N. As a further example, profile 168i indicates that a USERX 204a is authorized for PRIVILEGE3 associated with an object EFGH because user privilege value 206i is a Y. The present disclosure contemplates that user privilege values 206 may include any suitable number, letter, word, or other value capable of indicating whether users 204 are authorized for privileges associated with objects.

In certain embodiments, a profile name of a profile 168 may identify and/or include an object name and a privilege name. For example, XXXX.ABCD.PRIVILEGE1 of profile 168a includes an object name ABCD and a privilege name PRIVILEGE1. In certain embodiments, a profile 168 may refer to a RACF profile associated with a RACF class 202. A RACF class 202 may correspond to one or more objects and/or object types of a database, such as one or more objects and/or object types of an IBM Database 2 (DB2®). As described above, RACF may use different names to identify objects and/or privileges associated with objects than DB2 uses to identify those objects and/or those privileges. In such embodiments, profiles 168 may be complex and difficult for a user 135 to interpret. For example, a user 135 may not be familiar with RACF and/or its naming format.

Modifications, additions, or omissions may be made to profiles 168 without departing from the scope of the invention. Although particular examples have been used to illustrate profiles 168, this disclosure contemplates that any suitable user privilege information may be included in profiles 168. Further, although FIG. 2A illustrates a class 202 corresponding to a particular object of database 125, the present disclosure contemplates a class 202 corresponding to any number of objects of database 125, such as one object, two objects, ten objects, twenty objects, a hundred objects, and so on. Additionally, although FIG. 2A illustrates nine profiles 168 (e.g., profiles 168a through 168i), two classes 202 (e.g., classes 202a and 202b), two users 204 (e.g., users 204a and 204b), and nine user privilege values 206 (e.g., user privilege values 206a through 206i), this disclosure contemplates any number of profiles 168, classes 202, users 204, and user privilege values 206.

FIG. 2B illustrates an example of a logical view of a privilege matrix 166 that may be communicated to a user 135 and/or stored in one or more related files in a database of server memory 160 (e.g., a privilege matrix 166 that system 100 created by consolidating data from multiple databases, such as database 125 and database 130). The database may comprise multiple privilege matrices 166, such as one or more of privilege matrices 166a to 166n. Server memory 160 may store privilege matrices 166 in any suitable format. In addition, privilege matrices 166a through 166n may optionally be stored in database 125 for offline analysis. In certain embodiments, privilege matrices 166 may be custom components configured to interface and/or function with IBM architecture.

Privilege matrices 166 generally refer to subsets of consolidated catalog tables 164 (which may be interchangeably referred to as "object records") and user privilege records 168 (which may be interchangeably referred to as "profiles 168"), such as profiles 168a through 168i, and may include any suitable user privilege information associated with one or more objects managed by database 125 and protected by security manager 105. A privilege matrix 166 may include a first axis 208 that lists a user 204 (e.g., USERX 204a, USERY 204b, etc.), a second axis 210 that lists one or more privileges 212 (e.g., PRIVILEGE1 212a, PRIVILEGE2 212b, PRIVILEGE3 212c, etc.) associated with one or more objects of database 125, and for each intersection 214 (e.g., intersection 214a, 214b, 214c, etc.) of a user 204 and a privilege 212, a corresponding user privilege value 206 (e.g., user privilege values 206a through 206i). In certain embodiments, first axis 208 may also list an object (e.g., object ABCD, object EFGH, etc.) for which user privilege information is requested.

As described above, each intersection 214 generally includes a user privilege value 206 determined from one or more profiles 168. For example, intersections 214a include user privilege values 206a, 206b, and 206g; intersections 214b include user privilege values 206c, 206e, and 206h; and intersections 214c include user privilege values 206d, 206f, and 206i. According to the illustrated embodiment, a user privilege value 206 may include a Y or a N (i.e., a yes or a no, respectively) and indicate whether a user 204 is authorized for a particular privilege associated with a particular object (e.g., authorized to access an object, modify an object, delete an object, perform any other suitable operation related to an object, and/or any combination of the preceding). For example, user privilege value 206a indicates that a USERX 204a is authorized for PRIVILEGE1 associated with an object ABCD because user privilege value 206a is a Y. As another example, user privilege value 206b indicates that a USERY 204b is not authorized for PRIVILEGE1 associated with object ABCD because user privilege value 206b is a N. The present disclosure contemplates that user privilege values 206 may include any suitable number, letter, word, or other value capable of indicating whether users 204 are authorized for privileges associated with objects.

As illustrated in FIG. 2B, a privilege matrix 166 generally refers to a centralized view of a spectrum of consolidated user privilege information. Consolidated user privilege information may include any data from profiles 168 (e.g., user identifiers, privileges 212 associated with objects and their corresponding user privilege values 206, etc.) and/or catalog table 164 (e.g., names of objects (such as objects ABCD and EFGH), names of the corresponding privileges 212, etc.) that has been added to or updated in privilege matrix 166. In certain embodiments, privilege matrix 166 may include a row for each consolidated subset of profiles 168 that correspond to a particular user 204 and a particular object. For example, the first row of privilege matrix 166 includes user privilege information consolidated from profiles 168a, 168c, and 168d. In such an example, the first row includes user privilege values 206 corresponding to both USERX 204a and object ABCD's associated privileges 212. Accordingly, each row of privilege matrix 166 identifies user privilege information associated with one selected object and one selected user.

In certain embodiments, first axis 208 may refer to one or more headings of one or more rows of a table and second axis 210 may refer to one or more headings of one or more columns of the table. In such embodiments, privilege matrix 166 may be presented in the form of a table of rows and columns. For example, the rows of privilege matrix 166 may be organized according to users 204 and objects, and the columns may be organized according to descriptors listing and/or describing privileges 112 associated with objects.

Modifications, additions, or omissions may be made to privilege matrix 166 without departing from the scope of the invention. Although particular examples have been used to illustrate privilege matrices 166, this disclosure contemplates any suitable user privilege information may be used to yield privilege matrices 166. Additionally, although FIG. 2B illustrates privilege matrix 166 as including two object names (e.g., ABCD and EFGH), two users 204 (e.g., USERX 204a and USERY 204b), three privileges 212 (e.g., PRIVILEGE1 212a, PRIVILEGE2 212b, and PRIVILEGE3 212c), and nine user privilege values 206 (e.g., user privilege values 206a through 206i), privilege matrix 166 may include any number of object names, users 204, privileges 212, and privilege values 214.

Figure 3:
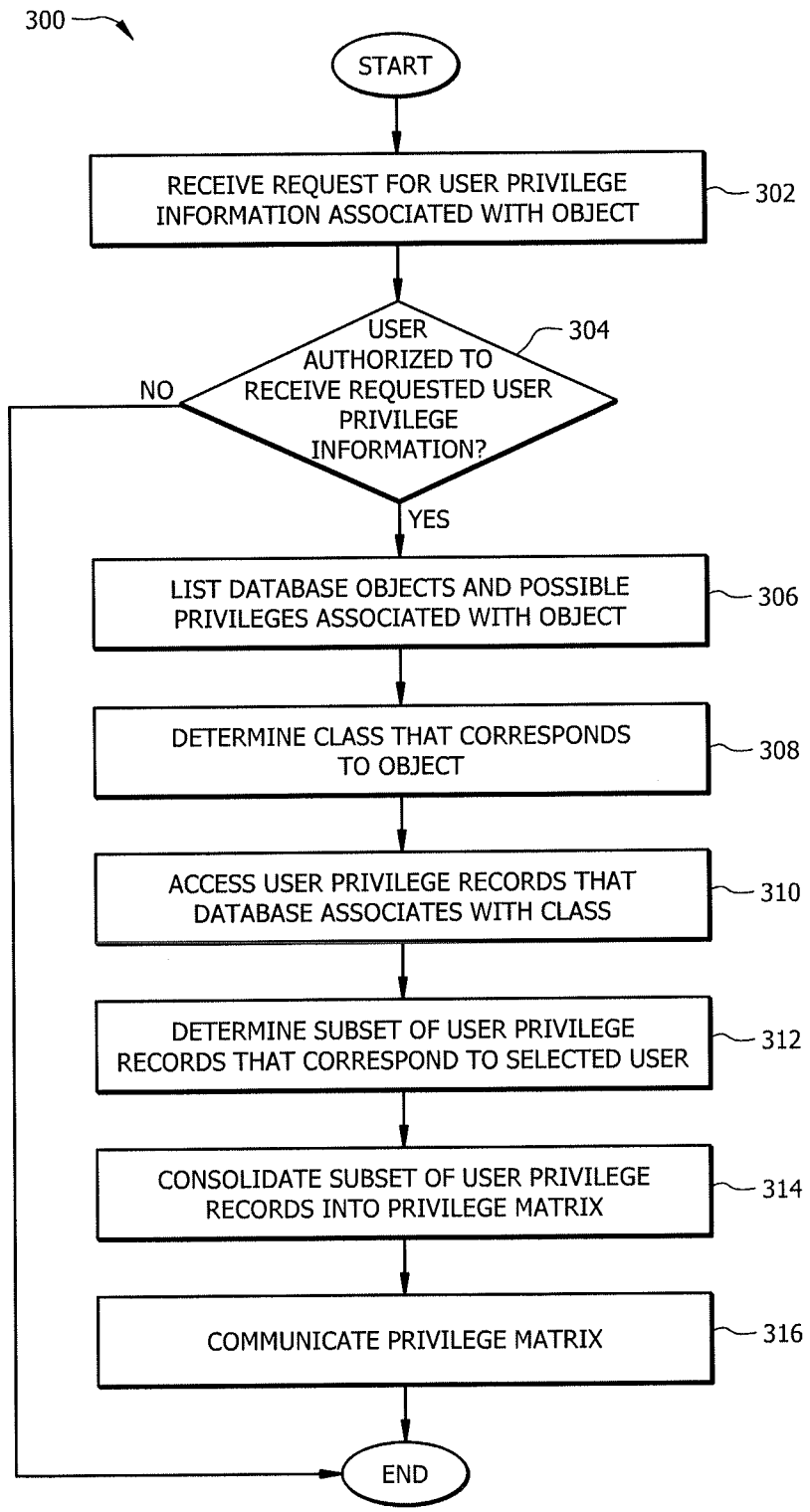
FIG. 3 illustrates a flowchart for consolidating user privilege information into a privilege matrix and communicating the privilege matrix.

FIG. 3 illustrates a method flowchart 300 for consolidating user privilege information into a privilege matrix 166 and communicating the privilege matrix. The method begins at step 302 by receiving a request for user privilege information associated with an object of database 125. For example, method 300 may receive a request 190 from a user 135 and/or an automated request 190 from one or more components of system 100. Request 190 may indicate one or more objects for which user privilege information is requested. In addition, request 190 may include one or more user identifiers indicating one or more users for whom user privilege information is being requested. Examples of user identifiers include a user name, social security number, date of birth, unique party identifier (e.g., a unique identifier assigned by the enterprise to identify the user), and so on.

Example objects associated with database 125 include: a database, table space, table, buffer pool, collection, column, index, Java archive (JAR), package, plan, role, schema, sequence, storage group, stored procedure, stored protocol, system, trusted context, user-defined distinct type, user-defined function (UDF), view, and so on. In certain embodiments, an object may refer to a DB2 object and/or object type, and may be defined in one or more catalog tables 164.

User privilege information generally refers to privileges, authorizations, and/or permissions that may be granted to or revoked from users 135. In certain embodiments, a privilege may allow a user 135 to perform a particular action, operation, and/or type of task against an object or other protected resource. Example privileges associated with an object of a database 125 include: access, alter, archive, bind, copy, create, delete, display, drop, execute, image copy, explain, index, insert, load, modify, monitor, recover, reference, reorganize, repair, select, start, stats, stop, trace, trigger, update, usage, use, and/or any other privilege suitable for a particular purpose.

At step 304, method 300 may determine whether a user 135 communicating request 190 is authorized to receive the requested user privilege information. For example, user 135 may be prompted to input user credentials. User credentials may be the user's name, a username, a password, an account name, a personal identification number, a private key, a social security number, a credit card number, any combination thereof, or any other information that can authenticate a user 135. In such an example, user credentials may be included in request 190 or may be communicated separately from request 190. Method 300 may then determine, based at least in part upon the user credentials, whether user 135 is authorized to receive the requested user privilege information. Method 300 may do so by comparing the user credentials included in request 190 against the user credentials contained in, for example, database 125 or database 130 to determine whether user 135 is authorized to receive the user privilege information.

If user 135 is not authorized to receive the requested user privilege information, method 300 may end. Otherwise, method 300 may proceed to step 306, where method 300 may read object records (e.g., catalog tables 164) from database 125, and provide a list identifying one or more objects of database 125 and the privileges that may be associated with the one or more objects. In certain embodiments, method 300 may provide any other suitable data included in catalog tables 164. Catalog tables 164 may include data identifying and describing various objects that have been defined in database 125, such as object names, privileges associated with defined objects, any other data describing objects of database 125, any other information associated with managing objects of database 125, and/or any combination of the preceding. In certain embodiments, user 135 may use the list to select one or more objects for which to query user privilege information.

At step 308, a class of a database 130 of security manager 105 is determined to correspond to the object. For example, method 300 may map the selected object of database 125 to the corresponding class of RACF database 130 of security manager 105. In certain embodiments, the corresponding class may be determined based at least in part upon data included in one or more catalog tables 164.

Method 300 may then access, based at least in part upon the determined class, user privilege records 168 that security manager 105 associates with the class at step 310. For example, method 300 may retrieve user privilege records 168 from database 130. Each user privilege record 168 may correspond to a user and may include user privilege information indicating whether that user is authorized for a particular privilege associated with the object. For example, a user privilege record 168 may include any of the following data associated with user privilege information: (1) a privilege (e.g., access, alter, archive, bind, copy, create, delete, display, drop, execute, image copy, explain, index, insert, load, modify, monitor, recover, reference, reorganize, repair, select, start, stats, stop, trace, trigger, update, usage, use, and so on); (2) a user privilege value (e.g., a value indicating whether the selected user is authorized for the privilege); (3) a class name (e.g., the name of the class that corresponds to the object associated with the privilege); (4) one or more authorization rules (e.g., authorization rules, such as RACF rules, of security manager 105 that application 162 used to determine the user privilege values); (5) a user identifier (e.g., identifying the user associated with the particular user privilege record 168); (6) any other information; and/or (7) any combination of the preceding.

At step 312, a subset of user privilege records 168 that correspond to one or more selected users, such as one or more users identified in request 190, may be determined. In certain embodiments, method 300 determines the subset of user privilege records corresponding to one or more selected users based at least in part upon user identifiers included in user privilege records 168 and/or data included in catalog tables 164 associated with the object.

At step 314, method 300 may consolidate the subset of user privilege records 168 into a privilege matrix 166. Privilege matrix 166 may comprise a first axis that lists one or more selected users, a second axis that lists one or more privileges associated with one or more objects of database 125, and for each intersection of a selected user and privilege, a corresponding user privilege value determined from the subset of user privilege records 168. Thus, privilege matrix 166 may identify the privileges associated with one or more objects and one or more selected users. In certain embodiments, the corresponding catalog tables 164 associated with the one or more objects also may be consolidated into privilege matrix 166.

The method then proceeds to step 316, where privilege matrix 166 may be communicated in any suitable format. In certain embodiments, method 300 communicates privilege matrix 166 via report 195. Report 195 may comprise one or more privilege matrices 166, one or more catalog tables 164 linked to one or more privilege matrices 166, one or more user privilege records 168 linked to one or more privilege matrices 166, and/or one or more RACF rules associated with one or more privilege matrices 166. In certain embodiments, report 195 may have a standardized format comprising standardized fields. The method may also format report 195 according to a particular format, such as a basic format or an enhanced format. As such, report 195 may be formatted in a tabular format that allows a user 135 to easily identify the privileges associated with the object and the respective user privilege values.

Method 300 may communicate report 195 to a display or other user interface, or communicate it to a database for storage. For example, method may provide report 195 to user 135 by utilizing client 115. In certain embodiments, user 135 may utilize client 115 to receive report 195. For example, method 300 may communicate report 195 in response to user 135 requesting user privilege information associated with one or more objects of database 125. In certain embodiments, method 300 may communicate report 195 to administrator 150 by utilizing administrator workstation 145.

In certain embodiments, the method 300 may communicate a privilege matrix 166 stored in database 125. For example, in response to a request 190, method 300 may store privilege matrix 166 in database 125. Method 300 may then receive a subsequent request 190 for privilege matrix 166. In response to subsequent request 190, method 300 may retrieve privilege matrix 166 from database 125 and communicate privilege matrix 166 to a user 135. In such an example, user 135 may perform offline analysis and impact analysis.

In certain embodiments, method 300 may also link privilege matrix 166 to the subset of user privilege records 168 and/or catalog tables 164 used to create privilege matrix 166. For example, method 300 may receive a request for the subset of user privilege records 168 used to create privilege matrix 166. In response, method 300 may link privilege matrix 166 to the respective subset of user privilege records 168 and communicate the linked subset of user privilege records 168. The linked subset of user privilege records 168 and/or catalog tables 164 may be communicated separately from privilege matrix 166 or concurrently with privilege matrix 166, such as via report 195.

Method 300 may also associate privilege matrix 166 with a RACF rule used to determine a selected user's privileges and corresponding user privilege values. Method 300 may do so by determining, for example, the RACF profile rule that governs the object. Examples of RACF rules include rules for determining profiles using wildcards, rules for defining profiles for different DB2 objects and types of objects, rules for creating new profiles and determining whether those new profiles undercut or override existing profiles, rules for deleting profiles and determining which objects will be impacted and whether users will gain or lose access to the impacted objects via other existing profiles, rules for determining whether access to an object is controlled by DB2 or security manager 105, and so on.

Once method 300 communicates report 195 at step 316, the method ends.

Although FIG. 3 illustrates method 300 as ending at step 316, in certain embodiments, the method may not end. In particular, instead of method 300 ending, each of steps 302-316 may be repeated for each user 135 associated with enterprise 110. In addition to repeating the steps of method 300 for each user 135, in certain embodiments, one or more of the steps of method 300 may be performed in parallel (e.g., at the same time) or substantially parallel (e.g., the processor may perform a first step for a first user and/or object and then subsequently perform that same step for the second user and/or object before performing a second step for the first user and/or object) with one or more steps of method 300 for another user and/or object.

Modifications, additions, or omissions may be made to method 300 without departing from the scope of the disclosure. Additionally, one or more steps in method 300 of FIG. 3 may be performed in parallel or in any suitable order.

Figure 4:
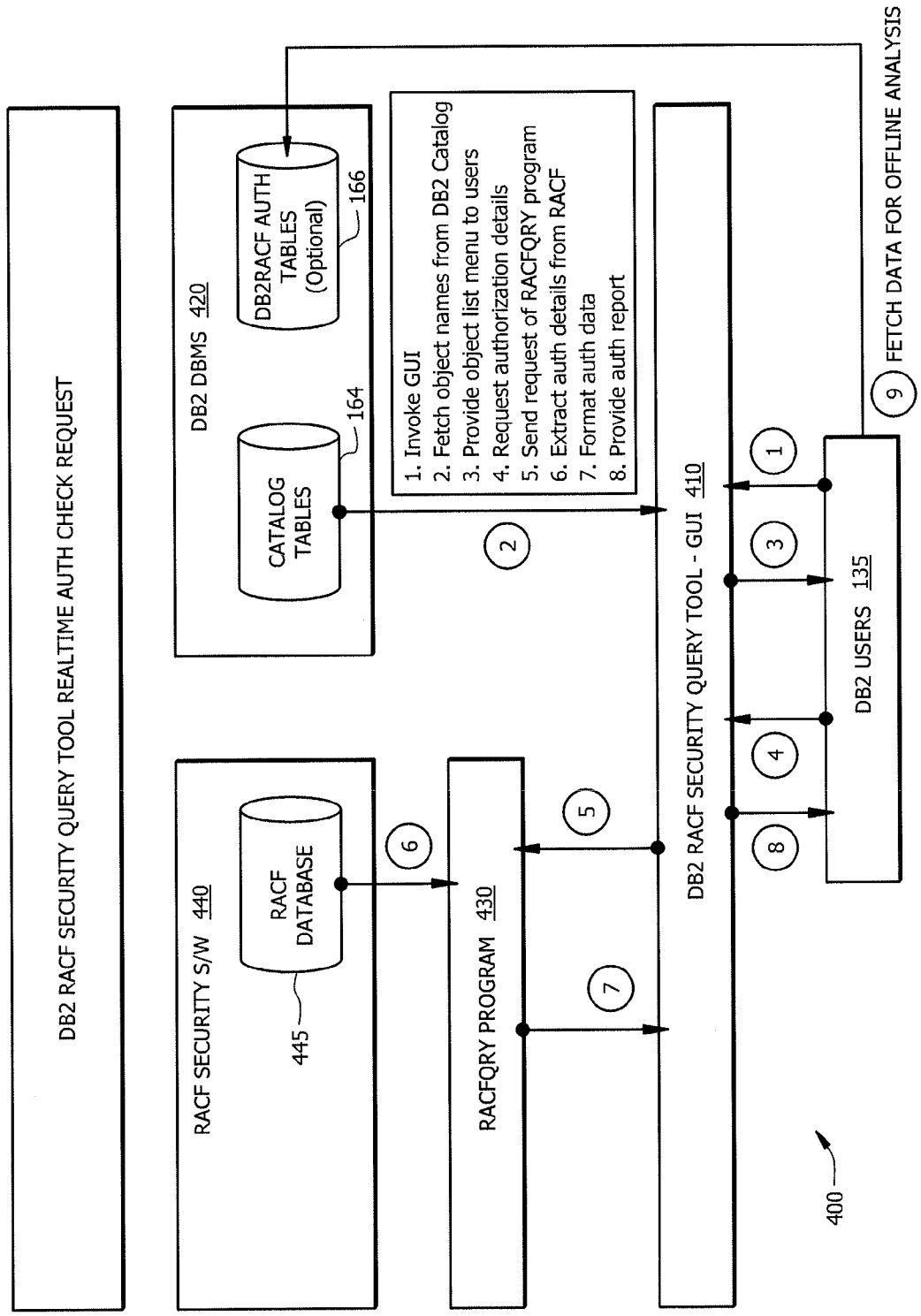
FIG. 4 illustrates a block diagram of an example system that consolidates and communicates user privilege information.

FIG. 4 illustrates a block diagram of an example system 400 that consolidates and communicates user privilege information according to certain embodiments. System 400 may include a DB2 RACF security query tool GUI module ("GUI module") 410, a DB2 DBMS module 420, a RACFQRY program module ("RACFQRY module") 430, and a RACF security software module ("RACF security module") 440. System 400 is generally operable to consolidate and communicate user privilege information.

GUI module 410 generally facilitates providing user privilege information to DB2 users 135 and may be a programmable logic device, a microcontroller, a microprocessor, any processing device, or any combination of the preceding. In certain embodiments, GUI module 410 may receive logic, rules, algorithms, code, tables, and/or other suitable instructions for performing the described functions and operations from DB2 user 135.

In general, GUI module 410 receives a request 190 for user privilege information from a user 135, such as a DB2 user 135, and provides user privilege information responsive to request 190. Thus, GUI module 410 generally enables a DB2 user 135 to request and receive user privilege information consolidated into a privilege matrix 166 via a report 195. Consolidated user privilege information may include any information associated with objects managed and protected by one or more modules of system 400. In certain embodiments, request 190 may indicate one or more objects for which user privilege information is requested. Request 190 also may include one or more user identifiers indicating one or more users for whom user privilege information is being requested. Examples of user identifiers include a user name, social security number, date of birth, unique party identifier (e.g., a unique identifier assigned by the enterprise to identify the user), and so on.

GUI module 410 may be communicatively coupled to DB2 DBMS module 420 and RACFQRY module 430 and is generally operable to receive information, transmit information, perform processing of information, communicate to other devices, control the operation and administration of consolidating and communicating user privilege information, or any combination of the preceding. For example, GUI module 410 may facilitate executing a job (such as instructions to retrieve, consolidate, and/or update user privilege information) and manipulating data for correlating one or more user privilege records 168 with a user and an object (and/or one or more catalog tables 164), and/or generating a privilege matrix 166 by consolidating one or more catalog tables 164 and one or more user privilege records 168 into privilege matrix 166. In particular, GUI module 410 may (1) retrieve object names (and/or other data associated with objects of DB2 DBMS module 420) from one or more catalog tables 164; (2) provide a list of object names (and/or other data) to DB2 users 135; (3) communicate a request to RACFQRY module 430 for user privilege information associated with one or more objects and one or more selected users; (4) consolidate user privilege information (e.g., one or more catalog tables 164 that DB2 DBMS module 420 associates with the one or more objects and one or more user privilege records 168 that RACF security module 440 associates with the one or more objects) received from DB2 DBMS module 420 and RACFQRY module 430 into a privilege matrix 166; (5) communicate privilege matrix 166 via a report 195 formatted according to a DB2 format; and/or (6) any other suitable operation.

GUI module 410 communicates privilege matrix 166 in any suitable format. In certain embodiments, GUI module 410 communicates privilege matrix 166 via report 195. Report 195 may comprise one or more privilege matrices 166, one or more catalog tables 164 linked to one or more privilege matrices 166, one or more user privilege records 168 linked to one or more privilege matrices 166, and/or one or more RACF rules associated with one or more privilege matrices 166. In certain embodiments, report 195 may have a standardized format comprising standardized fields. In such embodiments, a privilege matrix 166 communicated via report 195 may be formatted according to a format similar to a DB2 format, such as a SYS*AUTH format. GUI module 410 may also format report 195 according to a basic format or an enhanced format. As such, report 195 may be formatted in a tabular format that allows a DB2 user 135 to easily identify the privileges associated with the object and the respective user privilege values. GUI module 410 may communicate report 195 to a display or other user interface, or communicate it to a database for storage.

DB2 DBMS module 420 may be operable to communicate with GUI module 410 and receive data and/or instructions from GUI module 410. In certain embodiments, DB2 DBMS module 420 may facilitate retrieval of user privilege information and/or instructions in response to receiving request 190. For example, GUI module 410 may request a list of object names from one or more catalog tables 164, and in response to the request, DB2 DBMS module 420 may communicate the list of object names to GUI module 410. As another example, DB2 DBMS module 420 may communicate one or more catalog tables 164 associated with one or more selected objects to GUI module 410. In particular, DB2 DBMS module 420 may extract certain data associated with the one or more selected objects from one or more catalog tables 164 and communicate the extracted data to GUI module 410. In certain embodiments, DB2 DBMS module 420 may format and consolidate extracted data (e.g., object names, privilege names, etc.) into a privilege matrix 166. In such embodiments, DB2 DBMS module 420 may correlate the extracted data with user privilege information consolidated into privilege matrix 166.

In certain embodiments, DB2 DBMS module 420 may communicate a privilege matrix 166 stored in a database of DB2 DBMS module 420 to a user 135 via GUI 410. For example, request 190 may be automated to retrieve catalog tables 164 and/or user privilege records 168 for all database objects, transform catalog tables 164 and/or user privilege records 168 into one or privilege matrices 166, and store the one or more privilege matrices 166 in DB2RACF AUTH Tables for offline analysis. In such an example, a user and/or an administrator may subsequently request and receive a stored privilege matrix 166 and perform offline analysis.

In certain embodiments, DB2 DBMS module 420 manages and stores data associated with enterprise 110 of FIG. 1, such as objects defined in catalog tables 164 and user privilege information consolidated into privilege matrices 166 (which may be interchangeably referred to as "DB2RACF authority tables 166"). In certain embodiments, DB2 DBMS module 420 may refer to a relational database management system (DBMS) and may perform any suitable function for system 400, for example, data warehousing, data management, and data provisioning on platforms such as IBM DB2 Database (DB2®).

Catalog tables 164 generally refer to object records and include any data associated with objects that DB2 DBMS module 420 is managing and/or storing and that may be stored in one or more related files in one or more databases. For example, catalog tables 164 may include data identifying and describing various objects, such as object names, privileges associated with defined objects (e.g., specific functions associated with objects that may be performed by authorized users), any other data describing objects of DB2 DBMS module 420, any other information associated with managing objects of DB2 DBMS module 420, and/or any combination of the preceding. In the illustrated embodiment, catalog tables 164 refer to a set of DB2 tables containing information about the objects defined and managed by DB2 DBMS module 420. For example, catalog tables 164 may be SYS*AUTH tables that DB2 uses for storing data describing DB2 objects. As such, each row in a catalog table 164 identifies a DB2 object name and the corresponding privileges (e.g., specific functions that may be taken on an object).

Privilege matrices 166 generally include user privilege information associated with one or more objects managed by DB2 DBMS module 420 and protected by RACF security module 440. A privilege matrix 166 may include a consolidated subset of user privilege records 168 that correspond to one or more selected users/objects, catalog tables 164 that correspond to the one or more selected objects, and/or any other user privilege information. Thus, privilege matrix 166 may refer to a centralized view of a spectrum of user privilege information. In the illustrated embodiment, catalog tables 164 and user privilege records 168 consolidated into privilege matrices 166 are formatted according to a DB2 format.

RACFQRY module 430 refers to any suitable set of instructions, logic, or code embodied in a computer readable storage medium that facilitates retrieval of user privilege information included in one or more user privilege records 168. In certain embodiments, RACFQRY module 430 may be a programmable logic device, a microcontroller, a microprocessor, any processing device, or any combination of the preceding. RACFQRY module 430 may be operable to communicate with GUI module 410 and RACF security module 440.

In certain embodiments, RACFQRY module 430 receives data and/or instructions from GUI module 410 and provides user privilege records 168 to GUI module 410. For example, in response to receiving a command from GUI module 410 to retrieve user privilege information associated with one or more objects and one or more users, RACFQRY module 430 may access user privilege records 168 that RACF security module 440 associates with the one or more objects. RACFQRY module 430 may then determine a subset of user privilege records 168 that correspond to the one or more users. After determining the subset of user privilege records 168, RACFQRY module 430 may extract certain user privilege information from the subset of user privilege records 168 and communicate the extracted user privilege information to GUI module 410.

In certain embodiments, before accessing user privilege records 168, RACFQRY module 430 may determine whether the DB2 user 135 that communicated request 190 is authorized to receive the requested user privilege information. To do so, RACFQRY module 430 may instruct GUI module 410 to prompt DB2 user 135 to input user credentials before communicating request 190. User credentials may be the user's name, a username, a password, an account name, a personal identification number, a private key, a social security number, a credit card number, any combination thereof, or any other information that can authenticate a DB2 user 135. RACFQRY module 430 may then determine, based at least in part upon the user credentials, whether DB2 user 135 is authorized to receive the requested user privilege information.

In certain embodiments, RACFQRY module 430 may format and consolidate extracted user privilege information into a privilege matrix 166. In such embodiments, RACFQRY module 430 may process/transform user privilege information extracted from user privilege records 168 into privilege matrix 166 to make the user privilege information useable by DB2 users 135.

RACF security module 440 may be configured with a RACF database 445 and may represent any suitable set of instructions, logic, or code embodied in a computer readable storage medium that may be configured to control access to data managed by DB2 DBMS module 420. For example, RACF security module 440 may determine whether a DB2 user 135 is allowed to access objects based at least in part upon user privilege records 168 stored in RACF database 445. In such an example, RACF security module 440 may process one or more user privilege records 168 of RACF database 445 corresponding to a set of privileges associated with a particular object to determine if a particular user is authorized to use certain privileges against a particular object. As such, RACF security module 440 may protect against unauthorized access to objects or other data managed by DB2 DBMS module 420.

RACF security module 440 is also operable to receive information, transmit information, perform processing of information, communicate to other devices, or any combination of the preceding. For example, RACF security module 440 may communicate user privilege records 168 associated with an object that corresponds to a selected user in response to a request from RACFQRY module 430. In such an example, RACF security module 440 may determine a class that it associates with that object and retrieve user privilege records 168 associated with that class and that correspond to one or more selected users.

Each user privilege record 168 may correspond to a user and may include user privilege information indicating whether that user is authorized for a particular privilege associated with the object. For example, a user privilege record 168 may include any of the following: (1) an object name (e.g., a name of a database, table space, table, buffer pool, collection, column, index, Java archive (JAR), package, plan, role, schema, sequence, storage group, stored procedure, stored protocol, system, trusted context, user-defined distinct type, user-defined function (UDF), view, and so on); (2) a privilege (e.g., access, alter, archive, bind, copy, create, delete, display, drop, execute, image copy, explain, index, insert, load, modify, monitor, recover, reference, reorganize, repair, select, start, stats, stop, trace, trigger, update, usage, use, and so on); (3) a user privilege value (e.g., a value indicating whether the selected user is authorized for the privilege); (4) a class name (e.g., the name of the class that corresponds to the object associated with the privilege); (5) one or more authorization rules (e.g., authorization rules, such as RACF rules, used to determine the user privilege values); (6) a user identifier (e.g., identifying the user associated with the particular user privilege record 168); (7) any other information; and/or (8) any combination of the preceding. In the illustrated embodiment, RACF security module 440 uses a naming format for identifying objects and their corresponding privileges that is different from the naming format used in catalog tables 164. In such embodiments, objects of catalog tables 164 may correspond to classes of RACF security module 440.

RACF database 445 represents any components configured to store user privilege information associated with objects of DB2 DBMS module 420. For example, RACF database 445 may store user privilege records 168. In certain embodiments, RACF database 445 may facilitate providing user privilege information to DB2 users 135. For example, RACF database 445 may facilitate executing a job (such as instructions to retrieve, consolidate, and/or update certain user privilege records 168) and manipulating data for correlating a user and an object with a user privilege record 168.

Modifications, additions, or omissions may be made to the systems described herein without departing from the scope of the invention. The components may be integrated or separated. Moreover, the operations may be performed by more, fewer, or other components. Additionally, the operations may be performed using any suitable logic comprising software, hardware, and/or other logic. As used in this document, "each" refers to each member of a set or each member of a subset of a set.

Modifications, additions, or omissions may be made to the methods described herein without departing from the scope of the invention. For example, the steps may be combined, modified, or deleted where appropriate, and additional steps may be added. Additionally, the steps may be performed in any suitable order without departing from the scope of the present disclosure.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system, comprising:
an interface operable to:
receive a request for user privilege information for a user, identifying:
an object of a first database; and
a user identifier for the user;
one or more processors operable to:
determine a class of a second database that corresponds to the object in response to receiving the request for user privilege information for the user;
access a plurality of user privilege records, based on the user identifier, that the second database associates with the class, each user privilege record corresponding to the user;
determine a subset of the user privilege records that correspond to the user, each of the subset of user privilege records comprising:
one of a plurality of privileges; and
a user privilege value indicating whether the user is authorized for that privilege;
generate a privilege matrix using the subset of user privilege records, the privilege matrix comprising:
a first axis that lists the user;
a second axis that lists the plurality of privileges; and
for each intersection of the user and a privilege from the plurality of privileges, a corresponding user privilege value determined from the subset of user privilege records; and
the interface further operable to:
communicate the privilege matrix in response to the request.

2. The system of claim 1, wherein the user privilege records are formatted according to a Resource Access Control Facility ("RACF®") format and the privilege matrix is formatted according to a Database 2 ("DB2®") format.

3. The system of claim 1, wherein:
the one or more processors are further operable to associate the privilege matrix with a RACF rule used to determine the user privilege values; and
the interface is further operable to communicate the RACF rule with the privilege matrix.

4. The system of claim 1, wherein:
the one or more processors are further operable to:
link the privilege matrix and the subset of user privilege records used to create the privilege matrix; and
the interface is further operable to:
receive a request for the subset of user privilege records linked to the privilege matrix; and
communicate the linked subset of user privilege records.

5. The system of claim 1, wherein the plurality of privileges include one or more of: alter, create tab, create, delete, display, drop, image copy, index, insert, recover, reference, repair, select, trigger, and update.

6. The system of claim 1, wherein the request further comprises an object type selected from the group consisting of a database, a table space, a table, a column, a plan, a package, a stored procedure ("storproc"), an administrator authentication ("admin auth"), a system privilege, and a buffer pool ("bpool").

7. The system of claim 1, wherein:
the interface receives the request from an automated process;
the one or more processors are further operable to store the privilege matrix;
the interface is further operable to receive a subsequent user request for the user privilege information; and
the one or more processors are further operable to retrieve the stored privilege matrix for communication to the user.

8. A method, comprising:
receiving a request for user privilege information for a user, identifying:
an object of a first database; and
a user identifier for the user;
determining a class of a second database that corresponds to the object in response to receiving the request for user privilege information for the user;
accessing, by one or more processors, a plurality of user privilege records, based on the user identifier, that the second database associates with the class, each user privilege record corresponding to the user;
determining a subset of the user privilege records that correspond to the user, each of the subset of user privilege records comprising:
one of a plurality of privileges; and
a user privilege value indicating whether the user is authorized for that privilege;
generating a privilege matrix using the subset of user privilege records, the privilege matrix comprising:
a first axis that lists the user;
a second axis that lists the plurality of privileges; and
for each intersection of the user and a privilege from the plurality of privileges, a corresponding user privilege value determined from the subset of user privilege records; and
communicating the privilege matrix in response to the request.

9. The method of claim 8, wherein the user privilege records are formatted according to a Resource Access Control Facility ("RACF®") format and the privilege matrix is formatted according to a Database 2 ("DB2®") format.

10. The method of claim 8, further comprising associating the privilege matrix with a RACF rule used to determine the user privilege values and communicating the RACF rule with the privilege matrix.

11. The method of claim 8, further comprising:
linking the privilege matrix and the subset of user privilege records used to create the privilege matrix;
receiving a request for the subset of user privilege records linked to the privilege matrix; and
communicating the linked subset of user privilege records.

12. The method of claim 8, wherein the plurality of privileges include one or more of: alter, create tab, create, delete, display, drop, image copy, index, insert, recover, reference, repair, select, trigger, and update.

13. The method of claim 8, wherein the request further comprises an object type selected from the group consisting of a database, a table space, a table, a column, a plan, a package, a stored procedure ("storproc"), an administrator authentication ("admin auth"), a system privilege, and a buffer pool ("bpool").

14. The method of claim 8, wherein the method receives the request from an automated process, the method further comprising:
storing the privilege matrix;
receiving a subsequent user request for the user privilege information; and
retrieving the stored privilege matrix for communication to the user.

15. A non-transitory computer readable storage medium comprising logic, the logic, when executed by a processor, operable to:
receive a request for user privilege information for a user, identifying:
an object of a first database; and
a user identifier for the user;
determine a class of a second database that corresponds to the object in response to receiving the request for user privilege information for the user;
access a plurality of user privilege records, based on the user identifier, that the second database associates with the class, each user privilege record corresponding to the user;
determine a subset of the user privilege records that correspond the user, each of the subset of user privilege records comprising:
one of a plurality of privileges; and
a user privilege value indicating whether the user is authorized for that privilege;
generate a privilege matrix using the subset of user privilege records, the privilege matrix comprising:
a first axis that lists the user;
a second axis that lists the plurality of privileges; and
for each intersection of the user and a privilege from the plurality of privileges, a corresponding user privilege value determined from the subset of user privilege records; and
communicate the privilege matrix in response to the request.

16. The logic of claim 15, wherein the user privilege records are formatted according to a RACF format and the privilege matrix is formatted according to a DB2 format.

17. The logic of claim 15, further operable to associate the privilege matrix with a RACF rule used to determine the user privilege values and communicate the RACF rule with the privilege matrix.

18. The logic of claim 15, further operable to:
link the privilege matrix and the subset of user privilege records used to create the privilege matrix;
receive a request for the subset of user privilege records linked to the privilege matrix; and
communicate the linked subset of user privilege records.

19. The logic of claim 15, wherein the plurality of privileges include one or more of: alter, create tab, create, delete, display, drop, image copy, index, insert, recover, reference, repair, select, trigger, and update.

20. The logic of claim 15, wherein the logic receives the request from an automated process, the logic further operable to:
store the privilege matrix;
receive a subsequent user request for the user privilege information; and
retrieve the stored privilege matrix for communication to the user.

* * * * *